(12) United States Patent
Song et al.

(10) Patent No.: US 11,049,278 B2
(45) Date of Patent: Jun. 29, 2021

(54) SYSTEM AND METHOD FOR VISUAL IDENTIFICATION, AND SYSTEM AND METHOD FOR CLASSIFYING AND SORTING

(71) Applicant: Beijing Jingdong Qianshi Technology Co., Ltd., Beijing (CN)

(72) Inventors: Guoku Song, Beijing (CN); Zongjing Yu, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 283 days.

(21) Appl. No.: 16/345,112

(22) PCT Filed: Sep. 29, 2017

(86) PCT No.: PCT/CN2017/104605
§ 371 (c)(1),
(2) Date: Apr. 25, 2019

(87) PCT Pub. No.: WO2018/077011
PCT Pub. Date: May 3, 2018

(65) Prior Publication Data
US 2019/0287265 A1    Sep. 19, 2019

(30) Foreign Application Priority Data
Oct. 25, 2016  (CN) .................. 201610940584.X

(51) Int. Cl.
*H04N 7/18* (2006.01)
*G06T 7/73* (2017.01)
(Continued)

(52) U.S. Cl.
CPC ............ *G06T 7/74* (2017.01); *B07C 3/02* (2013.01); *B07C 3/10* (2013.01); *G06K 7/10366* (2013.01);
(Continued)

(58) Field of Classification Search
USPC ..................................................... 348/161
See application file for complete search history.

(56) References Cited

U.S. PATENT DOCUMENTS

| 10,574,600 B1* | 2/2020 | Chiarella ............. H04L 51/043 |
| 10,708,654 B1* | 7/2020 | Moraghan ........ H04N 21/25866 |
| 2016/0350689 A1* | 12/2016 | Baek ................ G06Q 10/06313 |

FOREIGN PATENT DOCUMENTS

| CN | 1749135 | 3/2006 |
| CN | 103785622 | 5/2014 |

(Continued)

OTHER PUBLICATIONS

International Search Report and Written Opinion, issued in the corresponding PCT application No. PCT/CN2017/104605, dated Dec. 28, 2017, 6 pages.
(Continued)

*Primary Examiner* — Nigar Chowdhury
(74) *Attorney, Agent, or Firm* — Hamre, Schumann, Mueller & Larson, P.C.

(57) ABSTRACT

The present disclosure provides a visual identification system and a classifying and sorting system. The visual identification system includes: a material information identification device, configured to identify material information of an item in a circulation box; a server, configured to store a plurality of material templates for a plurality of items; receive the identified material information from the material information identification device via a network; retrieve a material template corresponding to the identified material information from the plurality of material templates; and send the retrieved material template to a photography device; and the photography device, configured to capture an image of the item conveyed into a photography area; receive the material template from the server via the network; and match the captured image with the received (Continued)

material template to determine position information of the item in the circulation box, the position information being used for sorting the item from the circulation box.

13 Claims, 4 Drawing Sheets

(51) Int. Cl.
*G06K 7/10* (2006.01)
*G06K 19/07* (2006.01)
*B07C 3/10* (2006.01)
*B07C 3/02* (2006.01)
*G06K 17/00* (2006.01)
*G06T 7/00* (2017.01)

(52) U.S. Cl.
CPC ..... *G06K 17/0022* (2013.01); *G06K 19/0723* (2013.01); *G06T 7/0004* (2013.01); *G06T 2207/30108* (2013.01); *G06T 2207/30164* (2013.01)

(56) References Cited

FOREIGN PATENT DOCUMENTS

| CN | 204129757 | 1/2015 |
| CN | 104438095 | 3/2015 |
| CN | 104598944 | 5/2015 |
| CN | 204799579 | 11/2015 |
| CN | 106552772 | 4/2017 |
| EP | 1642853 | 3/2008 |
| WO | 2006/045878 | 5/2006 |

OTHER PUBLICATIONS

Indian Office Action, issued in the corresponding Indian patent application No. 201917020450, dated Dec. 27, 2020, 5 pages.

Indonesian Office Action, issued in the corresponding Indonesian patent application No. P00201904399, dated Apr. 26, 2021, 5 pages (translation included).

* cited by examiner

SYSTEM AND METHOD FOR VISUAL IDENTIFICATION, AND SYSTEM AND METHOD FOR CLASSIFYING AND SORTING

CROSS-REFERENCE TO RELATED APPLICATION(S)

This application claims priority to Chinese Application No. 201610940584.X, entitled "SYSTEM AND METHOD FOR VISUAL IDENTIFICATION, AND SYSTEM AND METHOD FOR CLASSIFYING AND SORTING" and filed on Oct. 25, 2016, which is incorporated herein by reference in its entirety.

TECHNICAL FIELD

The present disclosure relates to electronic devices and, in particular, to a visual recognition system and a method thereof, and a classifying and sorting system and a method thereof.

BACKGROUND

With the rapid development of e-commerce, using a robot as a sorting mechanism can greatly enhance the flexibility and efficiency of the sorting. Therefore, the visual identification system has become a necessary auxiliary unit of the sorting system.

The visual identification system is generally a very complex system that requires accurate image acquisition and real-time response to external changes. In addition, the visual identification system is often required to track external moving targets in real time. Therefore, the visual identification system raises higher requirements on real-time performance of both hardware and software systems.

However, the existing visual identification systems are mainly used for positioning and detection of a single item or a smaller number of items, and cannot be adapted to the detection and the positioning of a larger number of goods in the e-commerce logistics warehouse. At present, smart cameras cannot meet the above requirements in terms of storage space and computing capability.

SUMMARY

In view of this, the present disclosure provides a visual identification system and a method thereof, and a classifying and sorting system using the visual identification system and a method thereof, wherein the visual identification system can shorten, by network technologies, the time of comparing template features in the visual identification system, and thus can effectively realize the identification and positioning of items.

The aspects of the present disclosure are intended to solve at least the above-mentioned problems and/or shortcomings and to provide at least the following advantages.

An exemplary embodiment of the present disclosure provides a visual identification system that may include: a material information identification device, configured to identify material information of an item in a circulation box; a server, configured to store a plurality of material templates for a plurality of items; receive the identified material information from the material information identification device via a network; retrieve a material template corresponding to the identified material information from the plurality of material templates; and send the retrieved material template to a photography device; and the photography device, configured to capture an image of the item conveyed into a photography area; receive the material template from the server via the network; and match the captured image with the received material template to determine position information of the item in the circulation box, the position information being used for sorting the item from the circulation box.

Preferably, the material information identification device may include an RFID radio frequency identification device, the RFID radio frequency identification device including a RFID tag attached to the circulation box and a RFID reader mounted at a predetermined position.

Preferably, the network may include an Ethernet.

Preferably, the visual identification system may include: a conveying device, wherein a circulation box is placed on the conveying device so as to be conveyed along a pipeline, and an item to be sorted is placed in the circulation box; and a sorting device, configured to receive the determined position information from the photography device via the network; and sort the item from the circulation box according to the received position information when the circulation box is conveyed to a sorting area.

Preferably, the visual identification system may further include an encoder configured to calculate an offset of the item from the photography area to the sorting area and encode the offset, and the sorting device may be further configured to calculate the position information of the item according to the encoding of the encoder to perform the sorting.

An exemplary embodiment of the present disclosure provides a visual identification system that may include: a material information identification device, configured to identify material information of an item in a circulation box; a photography device, configured to capture an image of the item conveyed into a photography area; a processor; and a memory storing computer executable instructions that, when executed by the processor, cause the processor to: retrieve a material template corresponding to the identified material information from a stored plurality of material templates for a plurality of items according to the identified material information; and match the captured image with the retrieved material template to determine position information of the item in the circulation box, the position information being used for sorting the item from the circulation box.

Preferably, the material information identification device includes an RFID radio frequency identification device, the RFID radio frequency identification device comprising a RFID tag attached to the circulation box and a RFID reader mounted at a predetermined position.

Preferably, the visual identification system further includes: a conveying device, wherein a circulation box is placed on the conveying device so as to be conveyed along a pipeline, and an item to be sorted is placed in the circulation box; and a sorting device, configured to receive the determined position information from the photography device via a network; and sort the item from the circulation box according to the received position information when the circulation box is conveyed to a sorting area.

Preferably, the instructions that, when executed by the processor, further cause the processor to calculate an offset of the item from the photography area to the sorting area, encoding the offset, and calculate the position information of the item according to the encoding to perform the sorting.

Preferably, the instructions that, when executed by the processor, further cause the processor to calculate an offset of the item from the photography area to the sorting area, and encode the offset, and the sorting device is further configured to calculate the position information of the item according to the encoding of the encoder to perform the sorting.

An exemplary embodiment of the present disclosure provides a visual identification method that may include: identifying material information of an item in a circulation box; retrieving a material template corresponding to the identified material information from a stored plurality of material templates for a plurality of items according to the identified material information; capturing an image of the item conveyed into a photography area; and matching the captured image with the retrieved material template to determine position information of the item in the circulation box, the position information being used for sorting the item from the circulation box.

Preferably, the visual identification method further includes: sorting the item from the circulation box according to the determined position information when the circulation box is conveyed to a sorting area.

Preferably, the visual identification method may further include calculating an offset of the item from the photography area to the sorting area, encoding the offset, and calculating the position information of the item according to the encoding to perform the sorting.

BRIEF DESCRIPTION OF THE DRAWINGS

The above and other aspects, features, and advantages of the exemplary embodiments of the present disclosure will be more apparent from the following description in connection with the accompanying drawings wherein.

DETAILED DESCRIPTION

Example implementations of the present disclosure are described below with reference to the drawings. The present disclosure provides a visual identification system and a classifying and sorting system using the same, wherein the visual identification system can shorten, by using network technology, the time of comparing template features in the visual identification system, and thus can effectively realize the identification and positioning of items.

Figure 1:
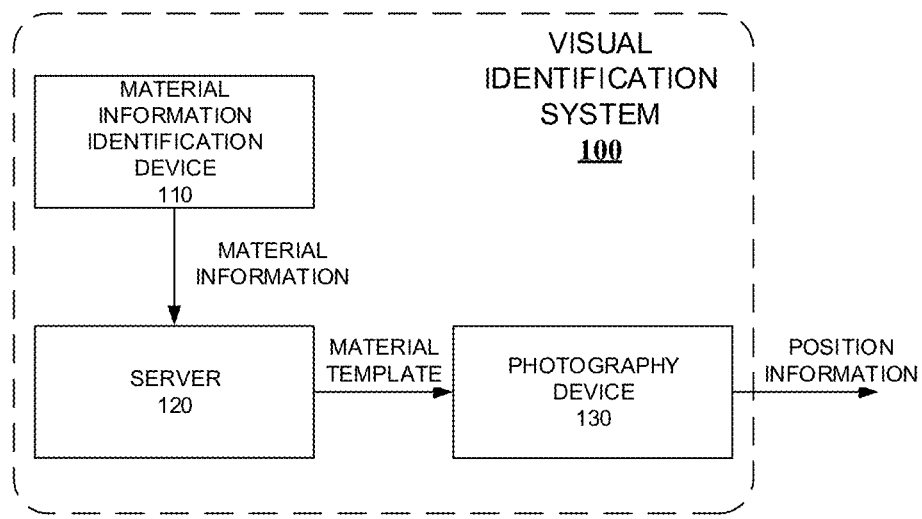
FIG. 1 is a schematic structural diagram showing a visual identification system according to an exemplary embodiment of the present disclosure.

FIG. 1 is a schematic structural diagram showing a visual identification system 100 according to an exemplary embodiment of the present disclosure. The exemplary embodiment of the present disclosure provides a visual identification system 100 that may include: a material information identification device 110, configured to identify material information of an item in a circulation box; a server 120, configured to store a plurality of material templates for a plurality of items; receive the identified material information from the material information identification device 110 via a network; retrieve a material template corresponding to the identified material information from the plurality of material templates; and send the retrieved material template to a photography device 130; and the photography device 130, configured to capture an image of the item conveyed into a photography area; receive the material template from the server 120 via the network; and match the captured image with the received material template to determine position information of the item in the circulation box, the position information being used for sorting the item from the circulation box. The material template is stored based on feature points of the image, wherein the feature points refer to features that are distinct and remain unchanged in the image. That is, the image is distinguished from other images by making use of the difference between the attribute features of different images.

In an embodiment, the network may include one of a wired network and a wireless network. In particular the network may be implemented as an Ethernet.

In an embodiment, the material information identification device 110 may be implemented as an RFID radio frequency identification device. Specifically, the RFID radio frequency identification device includes an RFID tag attached to the circulation box and an RFID reader mounted at a predetermined position.

Figure 2:
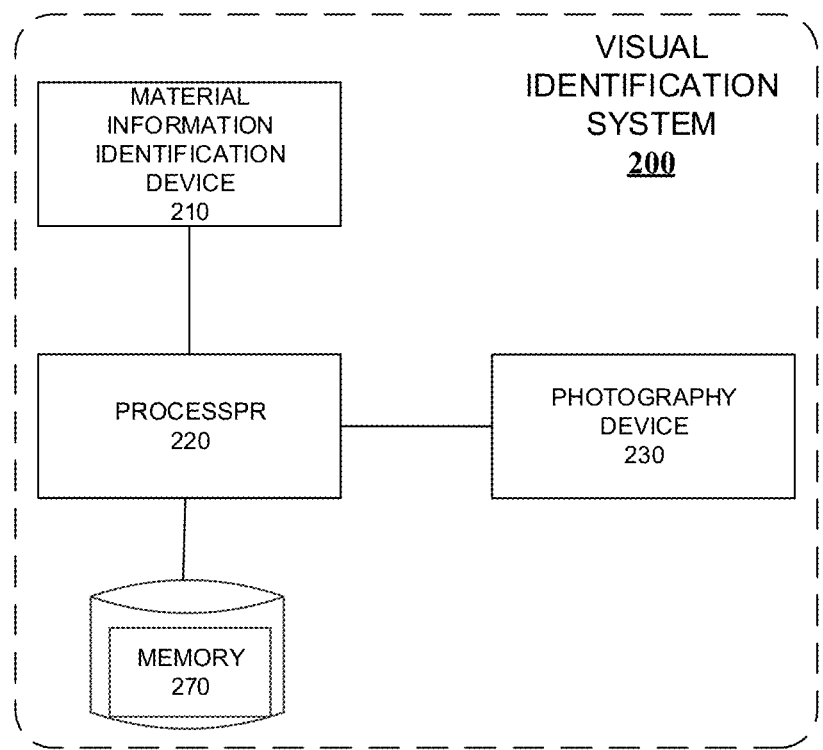
FIG. 2 is a schematic structural diagram showing a visual identification system according to another exemplary embodiment of the present disclosure.

FIG. 2 is a schematic structural diagram showing a visual identification system according to another exemplary embodiment of the present disclosure. According to the present exemplary embodiment of the present disclosure, the visual identification system 200 may include: a material information identification device 210, configured to identify material information of an item in a circulation box; a photography device 230, configured to capture an image of the item conveyed into a photography area; a processor 220; and a memory 270 storing computer executable instructions that, when executed by the processor 220, cause the processor 220 to retrieve a material template corresponding to the identified material information from a stored plurality of material templates for a plurality of items according to the identified material information; and match the captured image with the retrieved material template to determine position information of the item in the circulation box, the position information being used for sorting the item from the circulation box.

In an embodiment, the network may include one of a wired network and a wireless network. In particular the network may be implemented as an Ethernet.

In an embodiment, the material information identification device 210 includes an RFID radio frequency identification device. Particularly, the RFID radio frequency identification device comprising a RFID tag attached to the circulation box and a RFID reader mounted at a predetermined position.

Figure 3:
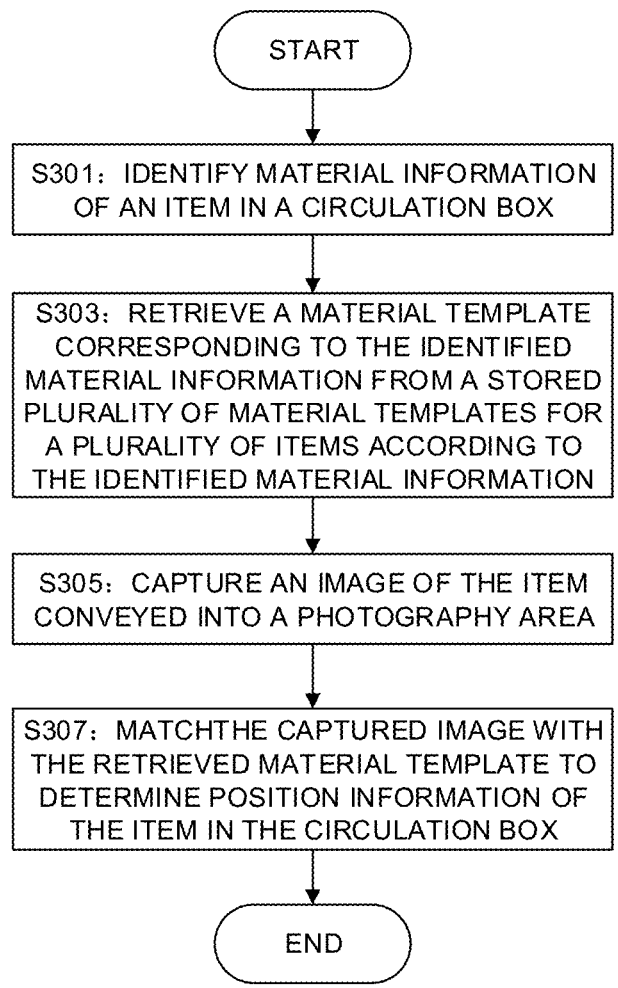
FIG. 3 shows a flowchart of a visual identification method according to an exemplary embodiment of the present disclosure.

Further, the present disclosure also provides a visual identification method applicable to the above-described visual identification system. FIG. 3 illustrates a flowchart of a visual identification method according to an exemplary embodiment of the present disclosure. Specifically, the visual identification method includes the following steps.

In step S301, material information of an item in a circulation box is identified;

In step S303, a material template corresponding to the identified material information is retrieved from a stored plurality of material templates for a plurality of items according to the identified material information;

In step S305, an image of the item conveyed into a photography area is captured;

In step S307, the captured image is matched with the retrieved material template to determine position information of the item in the circulation box, the position information being used for sorting the item from the circulation box.

It should be noted that although the position information is described above for sorting items from the circulation box, the visual identification system and the visual identification method as described above are not limited to use for sorting and may be applied to various fields, for example, security inspection field, intelligent robots, and the like. Furthermore, the items are not limited to being placed in the circulation box, but may also be placed directly or indirectly on the conveyer belt. A classifying and sorting system and a classifying and sorting method applied when the visual identification system and the visual identification method are applied to the field of item sorting will be described in detail below.

The above describes a visual identification system and method in which the visual identification system can shorten, by using network technology, the time of comparing template features in the visual identification system, and thus can effectively realize the identification and positioning of items.

In another exemplary embodiment, the visual identification system 100 may further include a conveying device, wherein a circulation box is placed on the conveying device so as to be conveyed along a pipeline, and an item to be sorted is placed in the circulation box; and a sorting device, configured to receive the determined position information from the photography device 130 via the network; and sort the item from the circulation box according to the received position information when the circulation box is conveyed to a sorting area.

Figure 4:
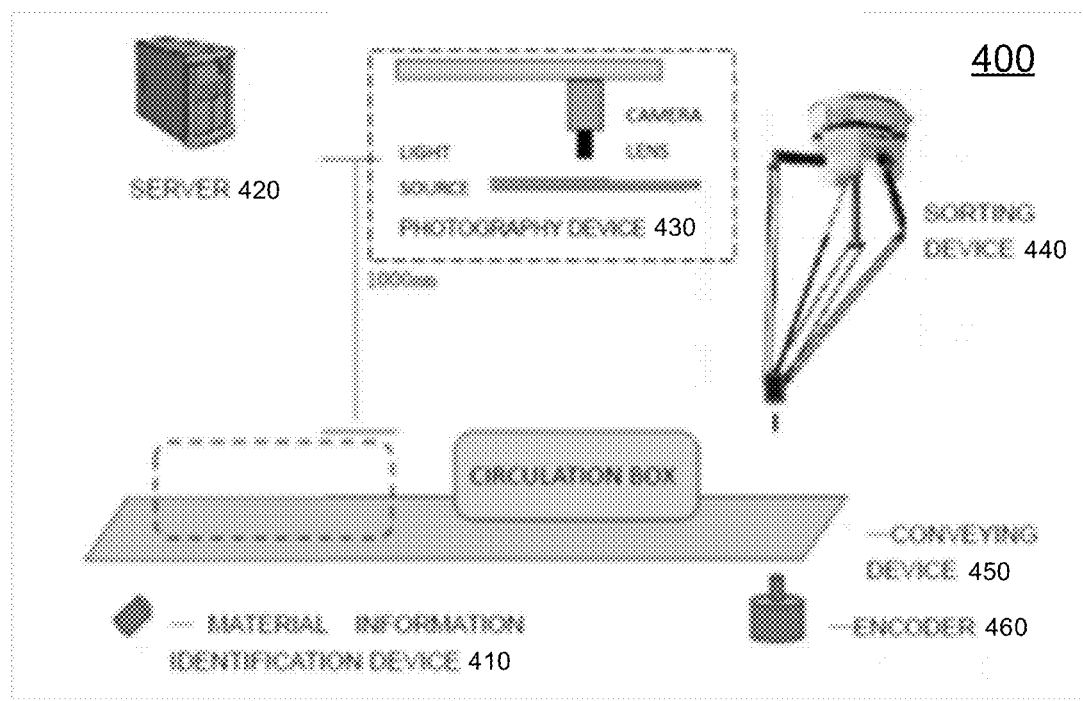
FIG. 4 is a schematic diagram showing a classifying and sorting system according to an exemplary embodiment of the present disclosure.

In such a case, the visual identification system including the conveying device and the sorting device may also be referred to as a classifying and sorting system, as shown in FIG. 4. FIG. 4 shows a schematic diagram of such a classifying and sorting system according to an exemplary embodiment of the present disclosure.

As shown in FIG. 4, the classifying and sorting system 400 according to an exemplary embodiment of the present disclosure includes the same or similar components as the visual identification system 100 shown in FIG. 1. Specifically, the material information identification device 410, the server 420, and the photography device 430 have the same configurations and functions respectively as those of the material information identification device 110, the server 120, and the photography device 130 as shown in FIG. 1. Therefore, the description of those components will be omitted.

In addition to the above components, the classifying and sorting system 400 further includes a conveying device 450 configured to place a circulation box thereon so as to convey the circulation box on the conveying device 450 along the pipeline, wherein the item to be sorted is placed in the circulation box; and a sorting device 440 configured to receive the determined position information from the photography device 430 via the network; and sort the item from the circulation box according to the received position information when the circulation box is conveyed to a sorting area. The structure and specific operation of the classifying and sorting system will be described in detail below.

Specifically, in the classifying and sorting system, the material information identification device 410 may be implemented as an RFID radio frequency identification device. Specifically, an RFID tag is attached to the circulation box and a RFID reader is mounted at a predetermined position of the conveying device, for example, mounted on both sides of the conveying device. In the system shown, the circulation box runs along the pipeline to the RFID information collection position, and the RFID reader reads the RFID information to obtain material information of the item in the circulation box.

Then, the server 420 receives the identified material information from the material information identification device 410, and retrieves the material template corresponding to the identified material information from the stored plurality of material templates for the plurality of items by using the received material information. The server 420 is implemented as an industrial control computer, and its internal large-capacity hard disk acts as a medium for storing the material templates. The server interacts with the photography device 430 in real time through a communication interface (for example, an integrated Ethernet communication card). Before the circulation box moves to the photography position, the server 420 should complete the loading of the corresponding material template group to narrow the scope to be retrieved. Then, a material template with feature points is sent to the photography device 430 through a network such as an Ethernet. As described above, the server 420 may store a plurality of material templates for a plurality of items, and therefore, the classifying and sorting system can realize detection for a plurality of items, and solve the problem in the prior art that only a single item or a few items can be positioned and detected.

The photography device 430 may include a support frame, a camera lens, and a light source, and may be implemented as, for example, a two-dimensional camera. Specifically, the photography device 430 is used to perform image acquisition, and may further include an internal controller for controlling its operation. The photography device 430 may convert the captured image into digitized signals according to information such as pixel distribution and brightness, color, and the like, and the image processing system calculates these signals to extract features of the target. When the circulation box continues to move forward to the camera photography area (that is, the photography area) on the conveying device 450, the photography device 430 is triggered to acquire an image of the item in the circulation box, wherein the photography area may be a predetermined fixed position, for example, within the focal length of the photography device. Subsequently, the photography device 430 matches all the acquired features of the item with the pre-loaded template to determine the position information of the item, and then sends the determined position information of the item to the sorting device 340.

Finally, the sorting device 440 may perform the sorting in the sorting area based on the received position information of the item. The sorting device 440 may be implemented as a device such as a manipulator.

Alternatively, the classifying and sorting system 400 may further include an encoder 460 configured to calculate an offset of the item from the photography area to the sorting area and encode the offset. At this time, the sorting device 440 may be further configured to calculate the position information of the item according to the encoding of the encoder to perform sorting. As shown in FIG. 4, the encoder 460 may be mounted on the conveying device 450. That is to say, the convey of the circulation box on the conveying device generates an offset, and the sorting device 440 may calculate the offset of the item from the photography area to the sorting area by using the encoder 460 mounted on the conveying device 450, and then convert the offset into the exact grab position. In an embodiment, the encoder 460 may be mounted on a belt conveyor line to convert a displacement into a periodic electrical signal, and then convert the electrical signal into counting pulses, the number of pulses representing the magnitude of the displacement. The controller of the sorting device 440 uses the number of pulses to calculate the offset of the conveyor line in order to perform the sorting accurately.

It should be noted that the circulation box may also store a plurality of items. When the plurality of items are stored in the circulation box, the classifying and sorting system can realize the identification and sorting of the plurality of items by repeatedly performing the above process.

In another exemplary embodiment, the visual identification system 200 may further include a conveying device, wherein a circulation box is placed on the conveying device so as to be conveyed along a pipeline, and an item to be sorted is placed in the circulation box; and a sorting device, configured to receive the determined position information from the photography device via the network; and sort the item from the circulation box according to the received position information when the circulation box is conveyed to a sorting area.

Figure 5:
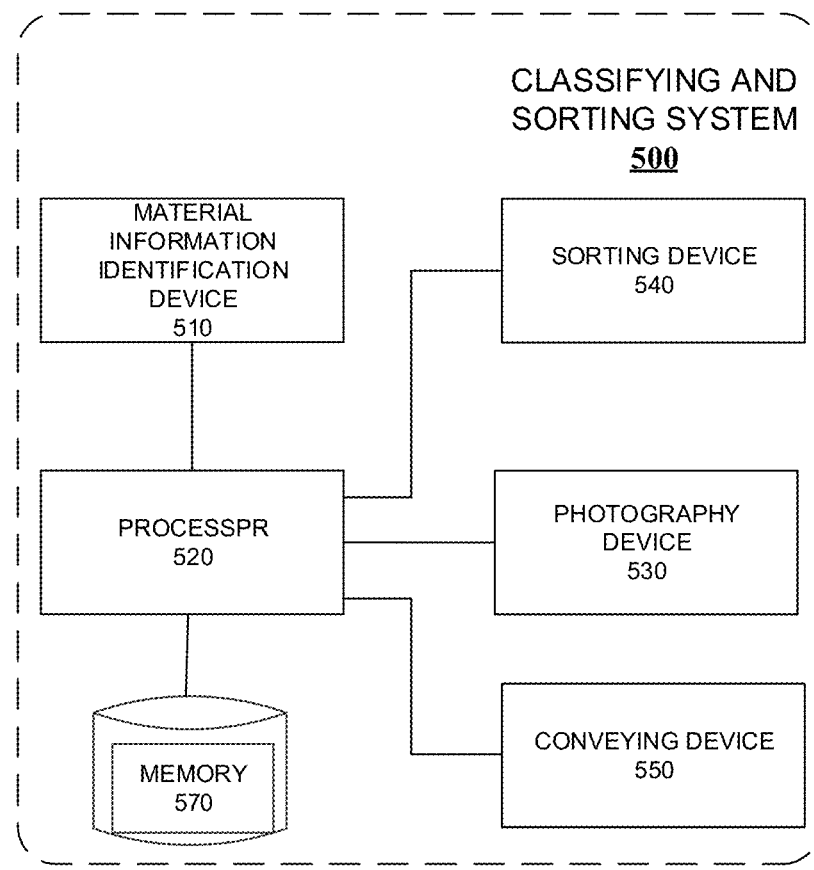
FIG. 5 is a schematic structural diagram showing a classifying and sorting system according to another exemplary embodiment of the present disclosure.

As previously described, in such a case, the visual identification system including the conveying device and the sorting device may also be referred to as a classifying and sorting system, as shown in FIG. 5. FIG. 5 shows a schematic diagram of such a classifying and sorting system according to an exemplary embodiment of the present disclosure.

As shown in FIG. 5, the classifying and sorting system 500 according to the present exemplary embodiment of the present disclosure includes the same or similar components as the visual identification system 200 shown in FIG. 2. Specifically, the material information identification device 510, the processor 520, the photography device 530, and the memory 570 have the same configurations and functions respectively as those of the material information identification device 210, the processor 220, and the photography device 230 and the memory 270 as shown in FIG. 2. Therefore, the description of those components will be omitted.

In addition to the above components, the classifying and sorting system 500 further includes a conveying device 550 configured to place a circulation box thereon so as to convey the circulation box on the conveying device 550 along the pipeline, wherein the item to be sorted is placed in the circulation box; and a sorting device 540 configured to receive the determined position information from the photography device 530 via the network; and sort the item from the circulation box according to the received position information when the circulation box is conveyed to a sorting area. The structure and specific operation of the classifying and sorting system will be described in detail below.

Specifically, in the classifying and sorting system 500, the material information identification device 510 may be implemented as an RFID radio frequency identification device. Specifically, a RFID tag is attached to the circulation box and a RFID reader is mounted at a predetermined position of the conveying device, for example, mounted on both sides of the conveying device. In the system shown, the circulation box runs along the pipeline to the RFID information collection position, and the RFID reader reads the RFID information to obtain material information of the item in the circulation box.

In an embodiment, the instructions that, when executed by the processor 520, further cause the processor 520 to calculate an offset of the item from the photography area to the sorting area, encoding the offset, and calculate the position information of the item according to the encoding to perform the sorting.

In an embodiment, the instructions that, when executed by the processor 520, further cause the processor 520 to calculate an offset of the item from the photography area to the sorting area, and encode the offset. The sorting device 520 is further configured to calculate the position information of the item according to the encoding of the encoder to perform the sorting.

Figure 6:
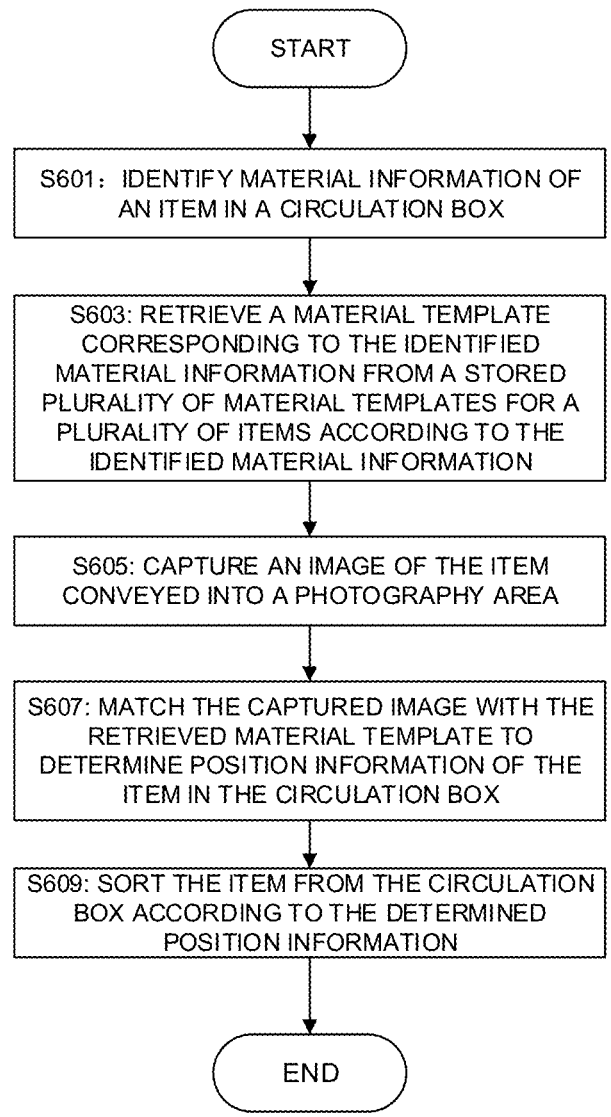
FIG. 6 shows a flowchart of a classifying and sorting method according to an exemplary embodiment of the present disclosure.

According to another exemplary embodiment of the present disclosure, a classifying and sorting method is provided. FIG. 6 shows a flowchart of a classifying and sorting method according to an exemplary embodiment of the present disclosure. Specifically, the classifying and sorting method may include the following steps.

In step S601, material information of an item in a circulation box is identified;

In step S603, a material template corresponding to the identified material information is retrieved from a stored plurality of material templates for a plurality of items according to the identified material information;

In step S605, an image of the item conveyed into a photography area is captured;

In step S607, the captured image is matched with the retrieved material template to determine position information of the item in the circulation box; and In step S609, the item is sorted from the circulation box according to the determined position information when the circulation box is conveyed to a sorting area.

The specific steps have been described in detail with reference to FIGS. 4 and 5.

In addition, the classifying and sorting method further includes calculating an offset of the item from the photography area to the sorting area, encoding the offset, and calculating the position information of the item according to the encoding to perform the sorting.

The above schemes describe a classifying and sorting system and a method thereof, wherein the classifying and sorting system can shorten, by using network technology, the time of comparing template features in the visual identification system, and thus can effectively realize the identification and positioning of items. Also, positioning and detection of a variety of items can be achieved.

It should be noted that the above scheme is only a specific implementation showing the concept of the present disclosure, and the present disclosure is not limited to the above implementation. Some of the above-described implementations may be omitted or skipped without departing from the spirit and scope of the present disclosure.

The foregoing method may be implemented in a form of program commands executable by a variety of computer devices and recorded in a computer readable recording medium. In this case, the computer readable recording medium may include separate program commands, data files, data structures, or combinations thereof. Meanwhile, program commands recorded in a recording medium may be specifically designed or configured for use in the present disclosure, or are known to those skilled in the art of computer software. The computer readable recording medium includes a magnetic medium such as a hard disk, a floppy disk or a magnetic tape, an optical medium such as a compact disk read only memory (CD-ROM) or a digital versatile disk (DVD), a magneto-optical medium such as a magneto-optical floppy disk, and, for example, a hardware device such as a ROM, a RAM, and a flash memory that stores and executes program commands. In addition, the program commands include machine language codes formed by a compiler and a high-level language that can be executed by the computer using an interpreter. The foregoing hardware device may be configured to operate as at least one software module to perform the operations of the present disclosure, and vice versa.

Although the operations of the methods herein are shown and described in a particular order, the order of the operations of the various methods may be varied, such that a particular operation and other operations may be performed in a reverse order or the particular operation may be performed at least partially concurrently with other operations. In addition, the present disclosure is not limited to the above-described exemplary embodiments, and may include one or more other components or operations, or omit one or more other components or operations, without departing from the spirit and scope of the disclosure.

The present disclosure has been described in connection with the preferred embodiments of the present disclosure, and it will be understood by those skilled in the art that various modifications, substitutions and changes may be made in the present disclosure. Therefore, the present disclosure should not be limited by the embodiments described above, but by the appended claims and their equivalents.

We claim:

1. A visual identification system, comprising:
    a material information identification device, configured to identify material information of an item in a circulation box;
    a server, configured to store a plurality of material templates for a plurality of items;
    receive the identified material information from the material information identification device via a network; retrieve a material template corresponding to the identified material information from the plurality of material templates; and send the retrieved material template to a photography device; and
    the photography device, configured to capture an image of the item conveyed into a photography area; receive the material template from the server via the network; and match the captured image with the received material template to determine position information of the item in the circulation box, the position information being used for sorting the item from the circulation box.

2. The visual identification system of claim 1, wherein the material information identification device comprises an RFID radio frequency identification device, the RFID radio frequency identification device comprising a RFID tag attached to the circulation box and a RFID reader mounted at a predetermined position.

3. The visual identification system of claim 1, wherein the network comprises an Ethernet.

4. The visual identification system of claim 1, further comprising:
    a conveying device, wherein a circulation box is placed on the conveying device so as to be conveyed along a pipeline, and an item to be sorted is placed in the circulation box;
    a sorting device, configured to receive the determined position information from the photography device via the network; and sort the item from the circulation box according to the received position information when the circulation box is conveyed to a sorting area.

5. The visual identification system of claim 4, further comprising: an encoder configured to calculate an offset of the item from the photography area to the sorting area, and encode the offset, and
    the sorting device is further configured to calculate the position information of the item according to the encoding of the encoder to perform the sorting.

6. A visual identification method, comprising:
    identifying material information of an item in a circulation box;
    retrieving a material template corresponding to the identified material information from a stored plurality of material templates for a plurality of items according to the identified material information;
    capturing an image of the item conveyed into a photography area; and
    matching the captured image with the retrieved material template to determine position information of the item in the circulation box, the position information being used for sorting the item from the circulation box.

7. The visual identification method of claim 6, further comprising:
    sorting the item from the circulation box according to the determined position information when the circulation box is conveyed to a sorting area.

8. The visual identification method of claim 6, further comprising: calculating an offset of the item from the photography area to the sorting area, encoding the offset, and calculating the position information of the item according to the encoding to perform the sorting.

9. A visual identification system, comprising:
    a material information identification device, configured to identify material information of an item in a circulation box;
    a photography device, configured to capture an image of the item conveyed into a photography area;
    a processor; and
    a memory storing computer executable instructions that, when executed by the processor, cause the processor to:
        retrieve a material template corresponding to the identified material information from a stored plurality of material templates for a plurality of items according to the identified material information; and
        match the captured image with the retrieved material template to determine position information of the item in the circulation box, the position information being used for sorting the item from the circulation box.

10. The visual identification system of claim 9, wherein the material information identification device comprises an RFID radio frequency identification device, the RFID radio frequency identification device comprising a RFID tag attached to the circulation box and a RFID reader mounted at a predetermined position.

11. The visual identification system of claim 9, further comprising:
    a conveying device, wherein a circulation box is placed on the conveying device so as to be conveyed along a pipeline, and an item to be sorted is placed in the circulation box; and
    a sorting device, configured to receive the determined position information from the photography device via a network; and sort the item from the circulation box according to the received position information when the circulation box is conveyed to a sorting area.

12. The visual identification system of claim 9, wherein the instructions that, when executed by the processor, further cause the processor to:
    calculate an offset of the item from the photography area to the sorting area, encoding the offset, and calculate the position information of the item according to the encoding to perform the sorting.

13. The visual identification system of claim 9, wherein the instructions that, when executed by the processor, further cause the processor to calculate an offset of the item from the photography area to the sorting area, and encode the offset, and
    the sorting device is further configured to calculate the position information of the item according to the encoding of the encoder to perform the sorting.

* * * * *